United States Patent

[11] 3,556,179

| [72] | Inventor | David Alexander Haile<br>Marinette, Wis. |
|---|---|---|
| [21] | Appl. No. | 746,129 |
| [22] | Filed | July 19, 1968 |
| [45] | Patented | Jan. 19, 1971 |
| [73] | Assignee | Rodman Industries, Inc.<br>St. Paul, Minn.<br>a corporation of Minnesota, by mesne assignments |

[54] SAW TABLE FOR RADIAL ARM SAW
9 Claims, 4 Drawing Figs.

[52] U.S. Cl. .................................................. 143/132,
143/6
[51] Int. Cl. ................................................. B27b 27/04
[50] Field of Search ........................................... 143/132,
132—6, 132—1, 132—2, 132—7, 6—47, 6—1,
157, 86, 86—5, 87, 38, 47—6

[56] References Cited
UNITED STATES PATENTS

| 2,610,729 | /1952 | Marcantel .................... | 143/132X |
| 3,294,129 | /1966 | Kohler et al. ................. | 143/47X |

FOREIGN PATENTS

| 373,392 | 0/1923 | Germany ...................... | 143/132 |

*Primary Examiner*—Andrew R. Juhasz
*Assistant Examiner*—James F. Coan
*Attorney*—Gunnar A. Gustafson, Jr.

ABSTRACT: A saw table for a radial arm saw of relatively high density sawable material is provided with an insert of relatively low density material in such a position as to be cut by the saw when in its several rip positions. Additionally, the several segments of the table are provided with cooperating tongues and grooves to maintain the segments flat.

PATENTED JAN 19 1971

3,556,179

INVENTOR.
DAVID A. HAILE
BY
HIS ATTORNEY

SAW TABLE FOR RADIAL ARM SAW

In conventional radial arms saws, a relatively thick boardlike material such as particle board is used as the saw table. Such materials are cut by the saw when it is used to cut through a piece being worked upon. When the saw is frequently used, the saw table is soon seriously damaged and must be replaced.

In such radial arm saw tables lower density materials have conventionally been used in order to preserve the saw since higher density materials tend to seriously dull the saw particularly when it is used frequently in the rip position. Unfortunately, such lower density materials are much more subject to dents, breakage, and abrasion and other like damage thus decreasing the useful life of the table.

Conventional radial arm saw tables are also susceptible to warping, particularly with respect to the "floating" segments of the table.

Applicant's invention is directed to improvements in such saw tables for radial arm saws in which an insert is provided in that portion of the table susceptible to being cut when the saw is in its rip position. In this way, the insert can be replaced without replacing the entire table.

The invention also contemplates a relatively high density material for the table, with a relatively low density material for the insert, thus increasing the table's useful life considerably.

The invention also contemplates the use of cooperating tongues and grooves on the various segments of the table and the fence, in order to further guard against warpage, particularly with respect to the floating segments.

These and other advantages of the invention will be obvious to those skilled in the art in view of the following specifications and drawings in which.

Figure 1:
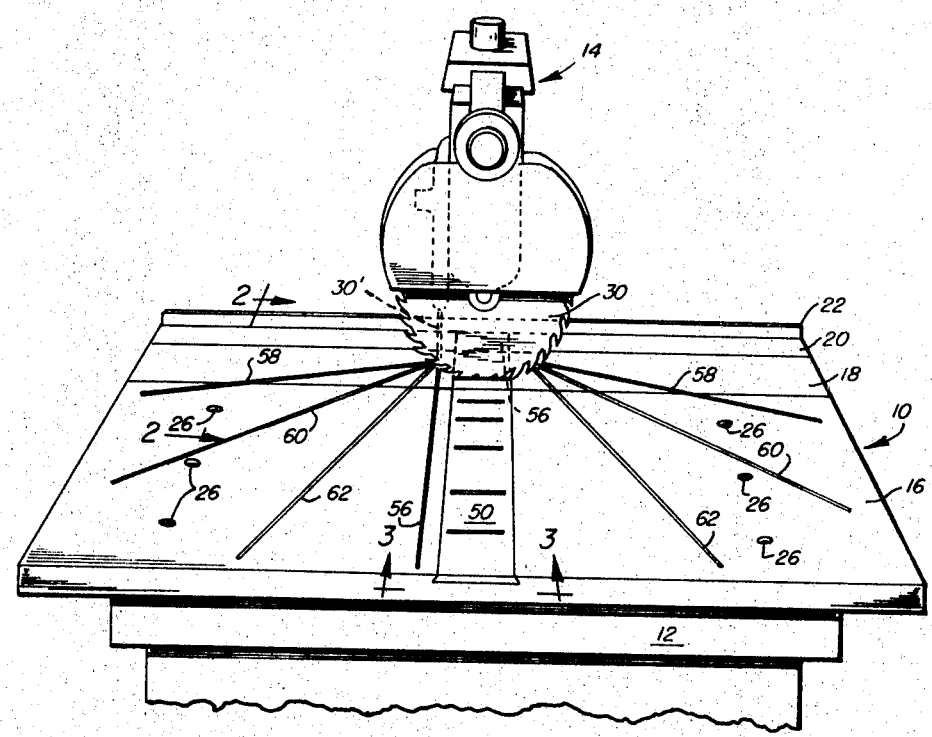
FIG. 1 is a view from the front of, and slightly above, a conventional radial arm saw provided with the saw table of the invention.

As shown in FIG. 1, the saw table 10 of the invention is supported from the base frame 12 of the radial arm saw generally indicated at 14. The table 10 comprises a plurality of segments shown in FIG. 1 as a fixed first segment 16 and two narrower floating segments 18 and 20. Also shown is a fence 22, which acts as a stop against which boards or other pieces being sawed are abutted.

The largest and most forwardly located segment 16 of the table 10 is fixed to the frame 12 by means such as the screws 24. The screws 24 are deeply countersunk in holes 26, thus to prevent striking of the screws 24 by the saw blade 30. At the rearward edge of the base frame 12, means (not shown) are provided for threadedly supporting a clamp 28 (see FIG. 2). When the clamp 28 is tightened, it bears against the face 32 of the fence 22 and clamps the fence 22, the segment 20, and the segment 18 tightly between the clamp 28 and the fixed segment 16 of the table 10. The rearward edge of the fixed segment 16 is provided with a groove as shown at 34. The floating segment 18, on its forward edge, has a tongue 36 cooperating with the groove 34 in the segment 16. The floating segment 18 has, at its rearward edge, a groove 38 cooperating with a tongue 42 in the forward edge of the floating segment 20. It will be apparent that the floating segments 18 and 20 and the fence 22 may be arranged in the sequence shown in FIG. 2 or may be arranged in other sequences. For example, the floating segment 20 could be placed adjacent to the clamp 28, with the fence 22 arranged between the floating segments 20 and 18. Similarly, the floating segment 20 could be placed adjacent to clamp 28, with the fence 22 arranged between the floating segment 18 and the fixed segment 16. In like manner, the segment 18 could be placed with its rearward edge against clamp 28 and the floating segment 20 could be placed in front of the floating segment 18, either with the fence 22 between the segments 18 and 20 or with the fence 22 between the floating segment 20 and the fixed segment 16. In order to provide for the various possible locations of the floating segments 18 and 20 and the fence 22, the rearward edge of the floating segment 20 is provided with a groove 44 for cooperation with any of the tongues shown. In like manner, the rearward edge 32 of the fence 22 is provided with a groove 46 for cooperation with any of the several tongues shown.

Figure 2:
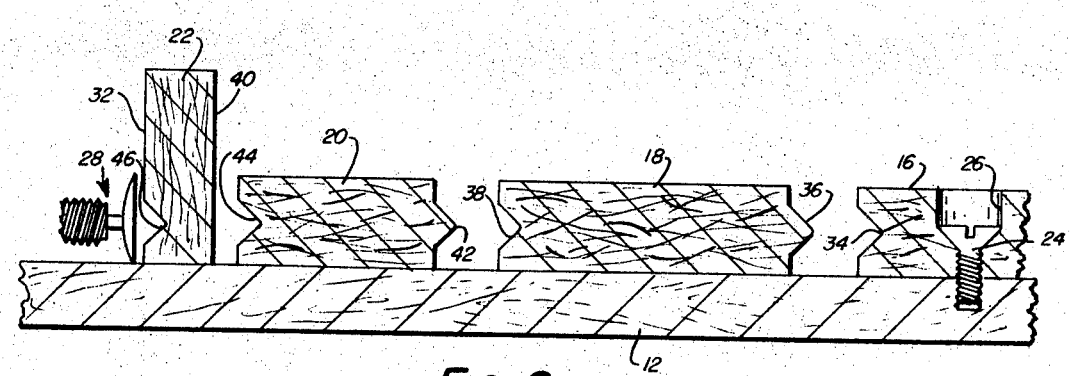
FIG. 2 is an enlarged cross section taken along the line 2–2 of FIG. 1.
Figure 3:
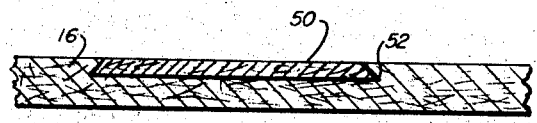
FIG. 3 is an enlarged view taken along the line 3–3 of FIG. 1.
Figure 4:
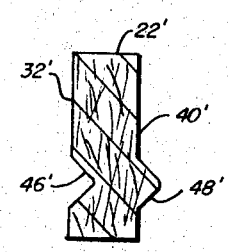
FIG. 4 shows a modification of the fence shown in FIG. 2.

For economy, the fence 22 is shown in FIG. 2 as having no tongue on its face 40 opposite to its face 32. It may, however, have such a tongue as shown in FIG. 4. In FIG. 4, the modified fence 22' is shown as having a groove 46' in its rearward face 32' and a tongue 48 in its forward face 40'. The fence 22' may, like the fence 22, be placed between the clamp 28 and the floating segment 20, or it may be placed in any one of the several positions previously mentioned for the fence 22. These various locations of the fence are provided in order to adjust the fence with respect to the saw blade 30 and the forward edge of the fixed segment 16. This adjustment in width of the available area of the table 10 is accomplished by the fact that the width of the floating segments 18 and 20 are different. As shown, the floating segment 18 is wider than the floating segment 20. Of course, the floating segments 18 and 20 and the fence 22 rest at their lower surface upon the base frame 12.

In its central portion, the fixed segment 16 is provided with a groove 52, generally dovetail in cross section. The dovetaillike groove 52 is provided with an insert 50 of similar cross section. In this way, the insert 50 may be removed from the fixed segment 16 by moving the same longitudinally of the insert 50 and the dovetaillike groove 52; that is to say, by moving the insert 50 toward the observer in FIG. 1. Each of the floating segments 18 and 20 may, if desired, be provided with similar inserts 54 and 56, respectively.

The material of the saw table 10 must be such as to be readily cut by the saw blade 30 without deleteriously affecting the same. Accordingly, it has been conventional to provide such saw tables from low or medium density particle boards comprising, usually, resin bound wood particles such as wood chips, sawdust, and the like. Such materials, however, are susceptible to warping, particularly with respect to the floating segments 18 and 20 and the fence 22. The fixed segment 16 is, to a somewhat lesser extent, also susceptible to warping. Even a very small degree of warping of the various portions of the table 10 makes the table and the saw unusable. The tongues and grooves provided on the fixed segment 16, the floating segments 18 and 20, and on the fence 22 overcome this problem.

Additionally, the saw blade 30 may be placed in the rip position, as shown in full lines in FIG. 1, at any one of an infinite number of distances from the fence 22. Thus, each time the saw is used for ripping a piece of a width different than any width previously ripped, the saw 30 will cut a new groove into the table 10 along the center line. Radial arm saws can cut along an almost infinite number of angles with respect to the fence 22. For example, the saw 30 may be turned at right angles to the fence 22, as shown in dotted lines in FIG. 1 at 30'. When used in this position, the saw will cut a groove such as groove 56 in the table 10, which groove is at a right angle to the fence 22. Other positions of the saw 30 will cut grooves at various angles to the fence 22, such as the 30°, 45°, and 60° angles shown by the grooves 58, 60, and 62, respectively. On angle cuts such as represented by the grooves 58, 60, and 62 respectively, once the saw has been used to cut at such an angle, all subsequent cuts at the same angle cause the saw 30 to pass through the previously formed groove. This is unlike the situation when the saw is used in its rip position, as shown in full lines in FIG. 1, since rips of boards are frequently done at various spacings and widths with respect to the fence 22. Accordingly, frequent use of the rip position of the saw causes the ultimate destruction of the table 10, whereas angular cuts are not so deleterious.

Applicant has provided the insert 50 in such a position as to receive the damage caused to the table 10 by use of the saw in the rip position. Thus, that portion of the table that is most frequently damaged (that portion represented by the insert 50) is readily replaceable. Also, since angular cuts such as those represented by the grooves 56, 58, 60, and 62 need only be cut once, applicant can provide high density quality materials, which are highly resistant to damage, for the segments 16, 18, 20, and 22 while providing relatively lower density and softer materials for the insert 50. Such high density materials are represented by the resin bound particle board sold under the trademark Resincore* by the Rocks Island Corporation of Rock Island, Illinois, and have densities of 50—90 pounds per cubic foot or even more. If such a high density material were used for the entire table 10, the frequent sawing into this material by the saw 30 would seriously dull the saw; however, the few angular cuts required as indicated, for example, by the grooves 56, 58, 60, and 62 do not deleteriously affect the saw. In that portion of the table 10 represented by the insert 50, frequent sawing is necessary and would seriously dull the saw except for the presence of the softer material of the insert 50. Any suitable natural, fabricated, or laminated board may be used for the insert 50, such as a piece of plywood. Frequent cutting of this material will not damage the saw and the insert 50 can be readily replaced without replacing the entire table 10.

Additionally, because of the greater resistance of such high density materials as Resincore* to damage, this previously serious problem has been solved. As indicated above, in order to insure against warping of the floating pieces 18 and 20, and in order to provide for secure clamping of these pieces against dislodgment, applicant provides the tongues and grooves 34, 36, 38, 42, 44, and 46. This arrangement also insures that the top surfaces of the segments 16, 18, and 20 are all flush with one another. Of course, the insert 50 is controlled in thickness so that its top surface is flush with the top surface of the segment 16. Similarly, the inserts 54 and 56 have their top surfaces flush with the top surfaces of the segments 18 and 20, respectively.

I claim:

1. A saw table for a radial arm saw comprising first sawable table means having a flat top surface, a fence, second sawable table means set into said first means, said second means having a top surface flush with the top surface of said first means and said second means being substantially perpendicular to said fence to position said second means in said first means such that, when in operative position beneath a radial arm saw, the saw will cut into only said second means on rip cuts of the saw.

2. The article of claim 1 in which said second table means is elongated and is removable from said first table means by sliding said second table means longitudinally of its length.

3. The article of claim 2 in which said first means has an undercut groove substantially dovetail in cross section, said second means is of substantially the same size and shape in cross section as said groove, and said second means is fitted into said groove.

4. The article of claim 3 in which said first means is of a relatively higher density than said second means.

5. The article of claim 1 in which said first means is of a relatively higher density than said second means.

6. A saw table for a radial arm saw comprising a base frame, a first sawable table member having a plurality of segments, one of said segments being secured to said base frame and having a rearward edge, a clamp mounted on said base frame, a fence, said fence and at least one of said segments resting upon said base and being clamped between said clamp and said rearward edge of said secured segment, a second sawable table member set into at least said one segment of said first member with the top surface of said second member flush with the top surface of said one segment and said second member being substantially perpendicular to said fence to position said second member in said one segment such that, when in operative position beneath a radial arm saw, the saw will cut into only said second member on rip cuts of the saw.

7. The article of claim 6 in which a like second sawable table member is set into each of said segments of said first member.

8. The article of claim 6 in which said first member is of relatively higher density than said second member.

9. The article of claim 6 in which there are cooperating tongues and grooves on edges of said segments and said fence.